United States Patent [19]

Yamada

[11] Patent Number: 5,209,016
[45] Date of Patent: May 11, 1993

[54] APPARATUS FOR OPENING AND SHUTTING A LID

[75] Inventor: Satoshi Yamada, Yokosuka, Japan

[73] Assignee: Kato Hatsujo Kaisha, Ltd., Yokohama, Japan

[21] Appl. No.: 798,563

[22] Filed: Nov. 26, 1991

[30] Foreign Application Priority Data

Feb. 25, 1991 [JP] Japan .............................. 3-015027[U]

[51] Int. Cl.$^5$ .............................................. E05D 15/50
[52] U.S. Cl. .................................... 49/193; 292/303; 292/91; 292/86; 16/231; 49/382
[58] Field of Search .......................... 49/192, 193, 382; 292/303, 91, 86, 19; 16/230, 231, 232; 267/154, 164, 182

[56] References Cited

U.S. PATENT DOCUMENTS

| | | |
|---|---|---|
| 2,349,486 | 5/1944 | Crosman . |
| 3,677,196 | 7/1972 | Schuller . |
| 4,222,149 | 9/1980 | Holbek ................ 49/193 X |
| 4,503,582 | 3/1985 | Gurubatham .......... 49/193 X |
| 4,929,019 | 5/1990 | Paakkonen et al. ...... 49/193 X |
| 4,947,583 | 8/1990 | Inui et al. ................ 49/193 |
| 4,985,962 | 1/1991 | Weber ................... 16/232 |
| 5,144,720 | 9/1992 | Aihara et al. ............ 16/232 |

FOREIGN PATENT DOCUMENTS 60-90042 6/1985 Japan .
304186 12/1990 Japan .......................... 49/193

*Primary Examiner*—Peter M. Cuomo
*Assistant Examiner*—Jerry Redman
*Attorney, Agent, or Firm*—Wenderoth, Lind & Ponack

[57] ABSTRACT

An apparatus for opening and closing a lid disposed rotatably on an opening of a box body selectively in two directions includes a pair of operating members independently movably supported one each at opposite ends of the lid, a spring member having a pair of rotary shafts disposed on an inner side of the lid so as to advance or retreat under the influence of resilient pressure of the spring member, two pairs of storage mouths formed in the edge of the opening of the box body at four corner portions thereof, two pairs of lock members pivotally supported inside the storage mouths for detachably supporting the rotary shafts above the storage mouths, and two pairs of rotary gear mechanisms attached to the lock members so that each pair of rotary gear mechanisms are interconnected to each other and the two pairs of rotary gear mechanisms are interlocked with each other. The rotary shafts are connected to the operating members so as to urge the operating members outwardly away from each other by virtue of the resilient pressure of the spring member. Each of the rotary shafts connected to the operating members is released from the lock members by a pressing operation of the corresponding operating member. The pressing operation of one of the operating members to open the lid in one direction causes one pair of lock members on the side being opened to be rotated and plunged into the corresponding pair of storage mouths due to the interlocking between the two pairs of rotary gear mechanisms.

3 Claims, 8 Drawing Sheets

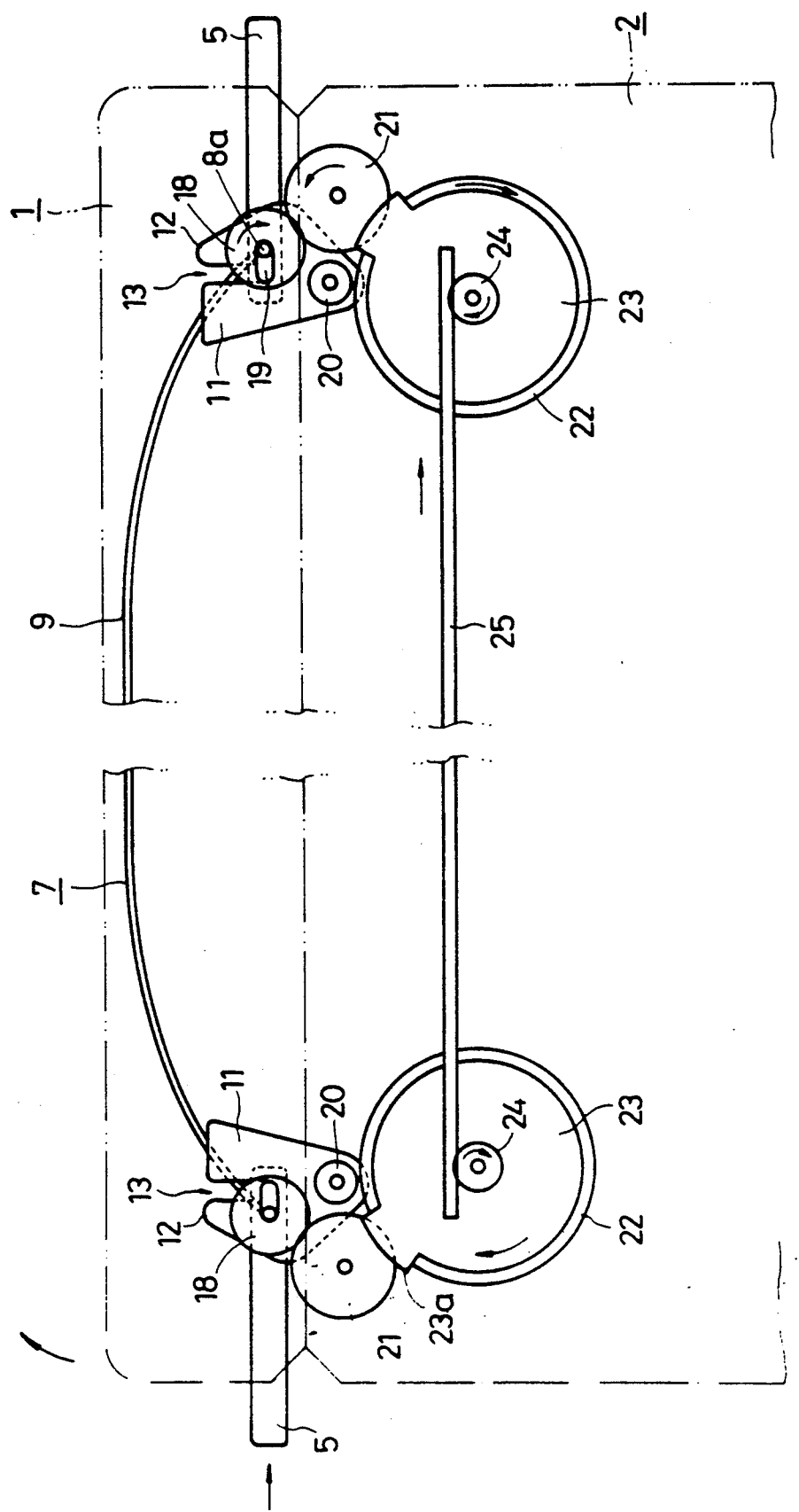

FIG. 8
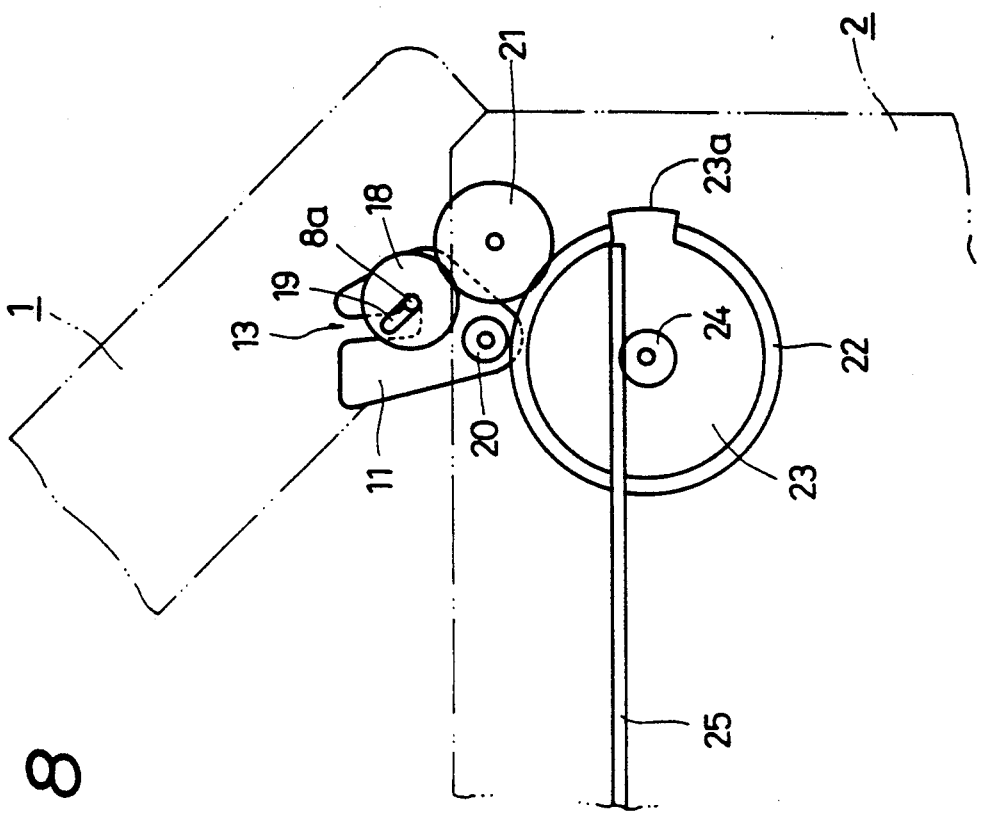
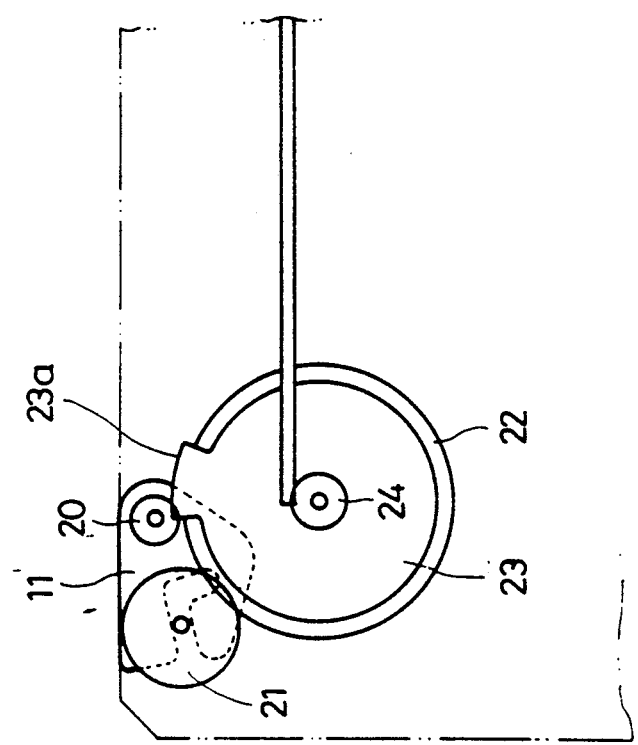

FIG. 9
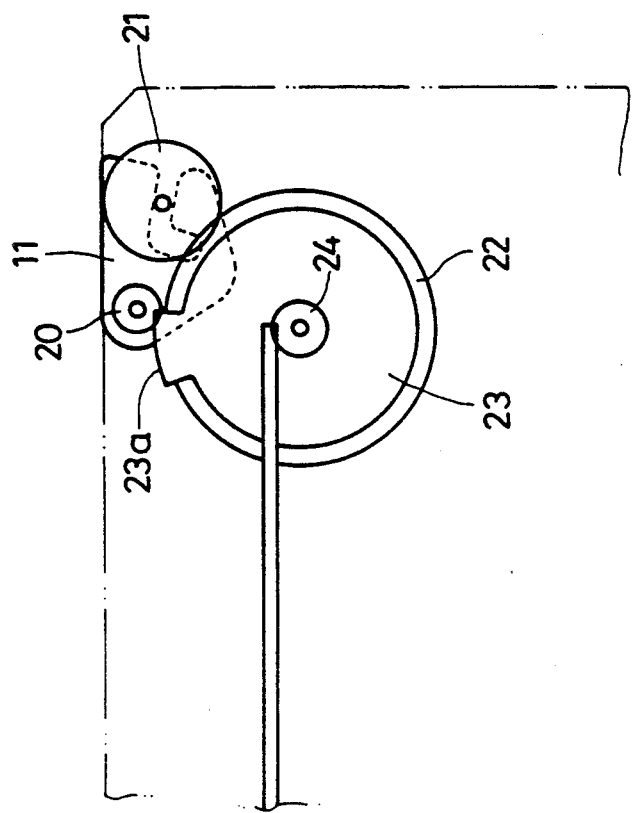
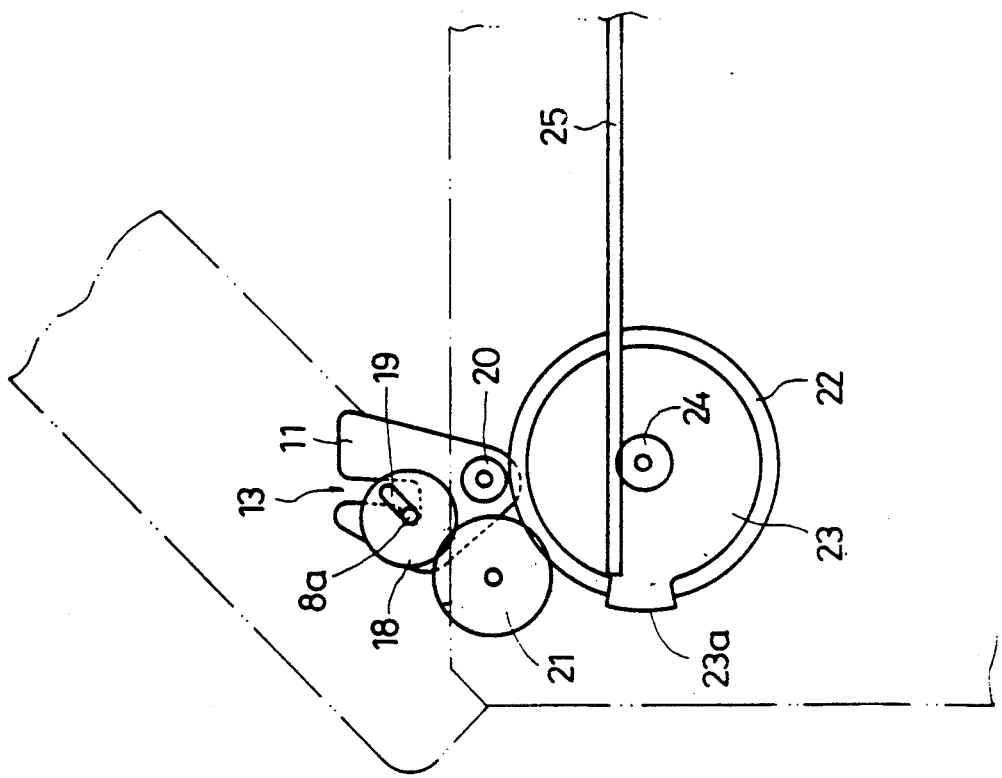

APPARATUS FOR OPENING AND SHUTTING A LID

BACKGROUND OF THE INVENTION

1. Field of the Invention

The present invention relates to an apparatus for opening and shutting selectively in two directions a lid on an automobile console box or any other lid (inclusive of a door) rotatably disposed on an opening of a box body.

2. Description of the Prior Art

An apparatus for opening and shutting the lid of an automobile console box selectively in two directions has been already disclosed in Japanese Utility Model Public Disclosure No. 60-90042, for example.

The conventional apparatus, though not illustrated specifically herein, comprises supporting shafts of a circular cross section disposed laterally one each along the opposite sides of the edge of an opening of a box body and bearings of a C-shaped cross section disposed integrally along the corresponding edges of a lid and adapted to be detachably wrapped one each around the supporting shafts so that the opening of the box body can be completely shut with the lid by rotatably wrapping the bearings around the corresponding supporting shafts. The exposure of the opening of the box body is attained either by removing one of the bearings from the corresponding supporting shaft and rotating the lid about the other supporting shaft as a fulcrum or by removing the other bearing from the corresponding supporting shaft and rotating the lid about the other supporting shaft as a fulcrum, thereby revealing the opening of the box body suitably in either of the two directions.

In accordance with the conventional apparatus, therefore, the lid provided for the box boy can be opened and shut selectively in two directions by adopting the very simple construction having the supporting shafts of a circular cross section disposed on the box body side and the bearings of a C-shaped cross section disposed on the lid side.

However, the conventional apparatus thus constructed has a structural fault in that since one of the bearings subjected to an operation of shutting or opening the lid must be forcibly fastened around the corresponding supporting shaft or forcibly relieved of the fastened state and since the other bearing must be immoderately rotated around the corresponding supporting shaft in response to the aforementioned operation, when the opening and shutting motions are frequently repeated, the C-shaped cross sections of the bearings are radially expanded or deformed and eventually prevented from allowing smooth opening and shutting motions or infallibly producing a perfectly open or shut state.

In view of the problems of the conventional apparatus described above, the present inventor has already proposed a lid switching device in U.S. application Ser. No. 07/764,192 filed on Sep. 23, 1991.

The switching device has the concept of movably supporting a pair of operating members independently on the opposite lateral sides of a lid, disposing on the inner side of the lid a pair of rotary shafts capable of advancing or retreating under influence of resilient pressure of spring means, connecting the rotary shafts one each to the operating members, thereby urging the operating members outwardly from each other by the resilient pressure of the spring means, forming upright lock members integrally on the opposite side edges of an opening of a box body so as to detachably fasten the rotary shafts thereto, and allowing the rotary shafts connected to the operating members to be severally unfastened from the corresponding lock members.

According to the switching device, therefore, the state of the box body closed with the lid is attained by setting the operating members, rotary shafts and spring means on the lid side and covering the opening of the box body with the lid and, as a result, enabling the rotary shafts connected to the operating members to be automatically fastened to the corresponding lock members on the box body side in consequence of the resilient pressure of the spring means. The selective release of the lid in the two directions from the box body is accomplished by pressing the operating member on the side to be opened inwardly against the resilient pressure exerted thereon, thereby enabling the rotary shaft connected to the operating member to be released from the corresponding lock member on the box body side and thereafter rotating the lid upwardly spontaneously around the rotary shaft still remaining fastened to the lock member and serving as a fulcrum of rotation.

Owing to the construction described above, the switching device always ensures production of an infallible opening or shutting operation with a click and a firmly opened or shut state. Even when the opening and shutting operations are frequently repeated, the switching device is free from the possibility of eventually ceasing to produce a smooth opening or shutting motion and an infallible opened or shut state as experienced with the aforementioned conventional apparatus.

In the switching device, however, since the upright lock members are integrally formed in advance on the edge of the opening of the box body, the lock member on the side to be opened is thrust out upwardly as raised from the edge of the opening of the box body when the lid is released in either of the two directions. Thus, the raised lock member has a fair possibility of impairing the attractiveness of appearance and seriously interfering with the insertion or extraction of an object into or from the box body.

SUMMARY OF THE INVENTION

The main object of the present invention is to provide a lid opening and shutting apparatus making full use of the formally proposed switching device and, at the same time, offering an effective solution to the problems encountered by the same switching device.

To accomplish this object, according to the present invention there is provided an apparatus for opening and closing a lid disposed rotatably on an opening of a box body selectively in two directions, which comprises a pair of operating members independently movably supported one each at opposite ends of the lid, spring means having a pair of rotary shafts disposed on an inner side of the lid so as to advance or retreat under the influence of resilient pressure of the spring means, the rotary shafts being connected to the operating members so as to urge the operating members outwardly away from each other by virtue of the resilient pressure of the spring means, two pairs of storage mouths formed in the edge of the opening of the box body at four corner portions thereof, two pairs of lock members pivotally supported inside the storage mouths for detachably supporting the rotary shafts above the storage mouths, each of the rotary shafts connected to the operating members being released from the lock members by a pressing operation of the corresponding operating member, and two pairs of rotary gear mechanisms attached to the lock members so that each pair of rotary gear mechanisms are interconnected to each other and the two pairs of rotary gear mechanisms are interlocked with each other, whereby the pressing operation of one of the operating members to open the lid in one direction causes one pair of lock members on the side being opened to be rotated and plunged into the corresponding pair of storage mouths due to the interlocking between the two pairs of rotary gear mechanisms.

The above and other objects, characteristic features and advantages of the present invention will become more apparent to those skilled in the art from the description of the invention made hereinbelow with reference to the accompanying drawings.

BRIEF DESCRIPTION OF THE DRAWINGS

FIG. 4 is a front view illustrating the state of the apparatus when a lid is shut relative to a box body.

FIG. 8 is an explanatory view illustrating the state in which the lid is opened in one direction.

FIG. 9 is an explanatory view illustrating the state in which the lid is opened in the opposite direction.

DETAILED DESCRIPTION OF THE PREFERRED EMBODIMENT

Now, the present invention will be described in detail below with reference to the illustrated embodiment.

In the illustrated lid opening and shutting apparatus, a lid 1 is rotatably disposed on a body 2 of an automobile console box, for example so that it is opened and shut selectively in two direction. Basically this apparatus adopts substantially the whole construction of the switching device proposed formerly by the present inventor and explained hereinbefore.

Figure 1:
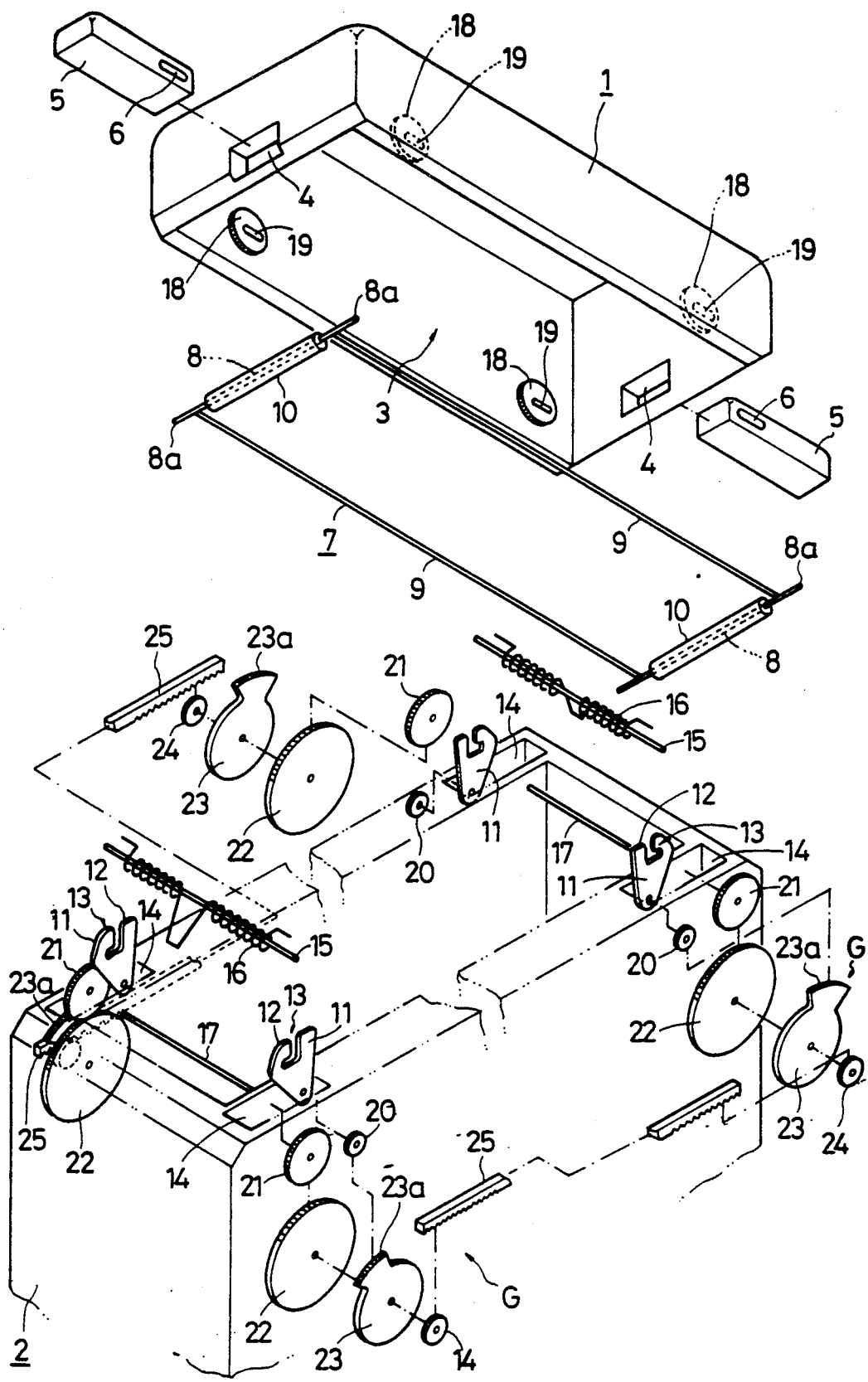
FIG. 1 is an exploded perspective view illustrating one embodiment of the lid opening and shutting apparatus according to the present invention.

To be specific, as illustrated in FIG. 1, on the side of the lid 1 the apparatus comprises a depressed part 3 formed in the lid 1, two opposed through holes 4 perforated one each in the opposite terminal walls of the lid 1 defining the depressed part 3, two operating buttons 5 each having a communicating hole 6 and each movably supported in the corresponding through hole 4, rectangular linear spring means 7 provided integrally with a pair of rotary shafts 8 and a pair of resilient parts 9 and disposed in a bent state within the depressed part 3, and collars 10 placed one each around the pair of rotary shafts 8 of the spring means 7 so that the resilient pressure derived from bending of the resilient parts 9 of the spring means 7 urge the operating buttons 5 outwardly away from each other inside the through holes 4. The rotary shafts 8 are idly inserted through the communicating holes 6 of the operating buttons 5.

On the side of the box body 2, the apparatus comprises four metallic lock members 11 each provided with a tapered guide part 12 and an L-shaped lock hole 13 and disposed on the opposite terminal parts of the opposed edges of an opening of the box body 2 so as to form two pairs and so that each of the rotary shafts 8 of the spring means 7 may be detachably fastened to the lock holes 13 of one pair of lock members 11.

In addition to the basic construction described above, the lid opening and shutting apparatus of the present invention comprises four storage mouths 14 bored in the opposite terminal parts of the opposed edges of the opening of the box body 2 and adapted to allow submersion therein or emersion therefrom of the lock members 11, common connecting shafts 15 serving to support the lock members 11 rotatably inside the storage mouths 14 positioned in the terminal parts, and double torsion springs 16 attached to the common connecting shafts 15, so that the resilient pressure of the torsion springs 16 continues to urge the lock members 11 in the terminal parts upwardly from the storage mouths 14 and, while the lid 1 is being opened, rotates the lock members 11 on the open side through gear mechanisms G to be specifically described hereinbelow and forces them to submerge in the storage mouths 14.

The double torsion springs 16 are so adapted that when the opposite terminal hook parts thereof are directly fastened to the corresponding lock members 11 and the central hook parts thereof are fastened to stationary shafts 17 disposed in parallel to the connecting shafts 15, the torsional resilient pressure produced serves the purpose of keeping the lock members 11 in their raised state at all times. These stationary shafts 17 and the connecting shafts 15 as well as the double torsion springs 16 are kept concealed with suitable means such as covers, for example.

The gear mechanisms G are provided one each for the lock members 11 and those on each side of the box body 2 are interconnected through a rack 25 to be specifically described hereinbelow so as to be driven in cooperation with each other. Each of the gear mechanisms G comprises a gear-shaped ring member 18 disposed on the side of the lid 1 and a plurality of gears disposed on the side of the box body 2. The gean-shaped ring members 18 have teeth formed on the their own circumferential surfaces and have bored in the central parts thereof oblong holes 19 for allowing the terminals 8a of the pair of rotary shafts 8 to be idly inserted therein. They are integrally projected from the opposed inner surfaces of the depressed part 3 of the lid 1 in the proximity of the terminal parts thereof.

Figure 3:
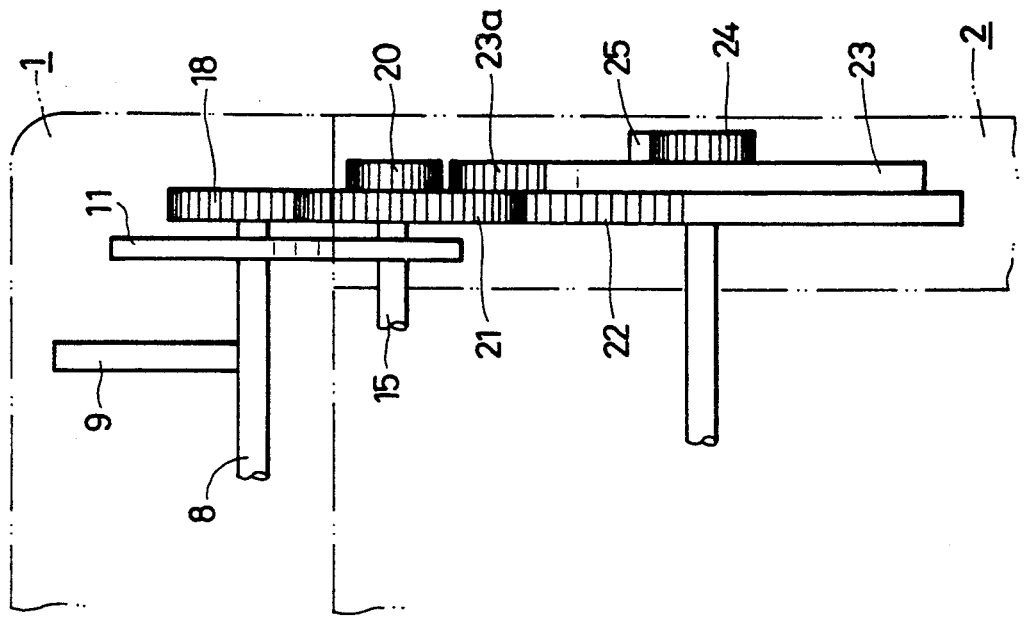
FIG. 3 is a side view of the rotary gear mechanism.
Figure 2:
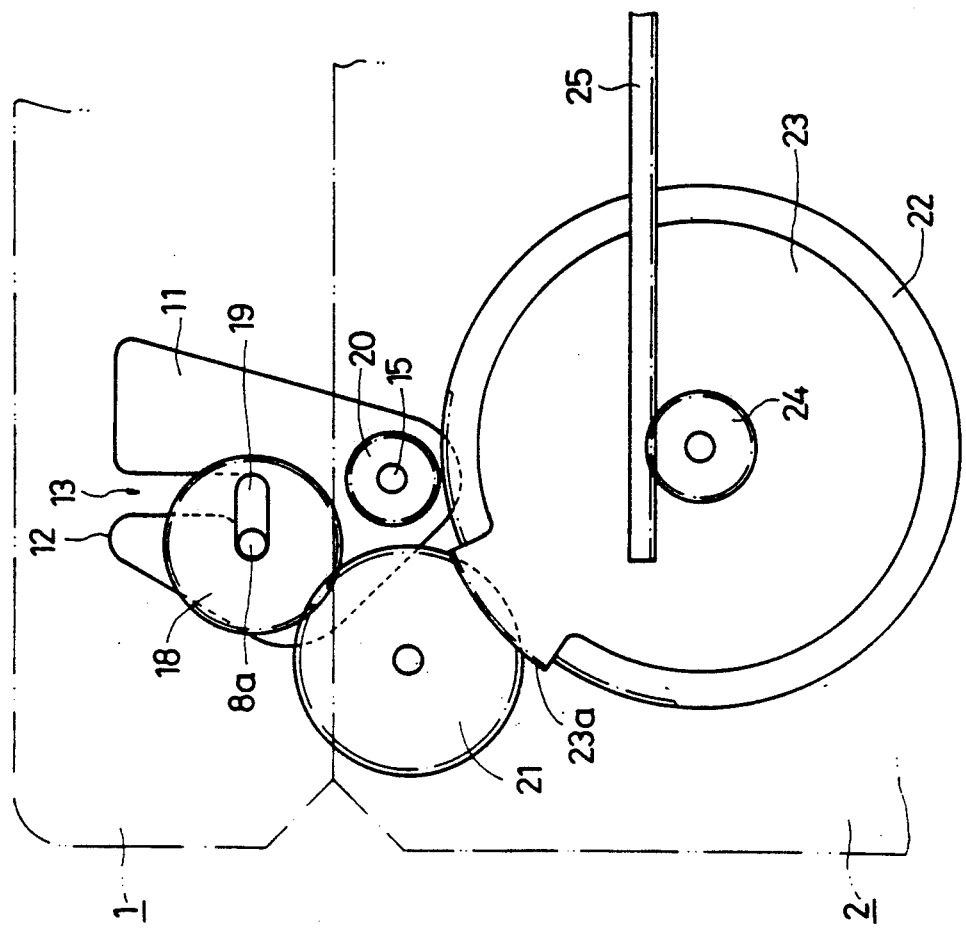
FIG. 2 is a front view illustrating the essential part of a rotary gear mechanism attached to a lock member.

As illustrated in FIGS. 2 and 3, the gears of each gear mechanism G comprise a first small gear 20 fixed to the terminal part of the connecting shaft 15, a second medium gear 21 meshed with the gear-shaped ring member 18 on the side of the lid 1, a third large gear 22 meshed with the second medium gear 21, a fourth large gear 23 disposed co-axially with the third large gear 22 and being meshed with the first small gear 20 when the lid is opened to a prescribed extent, and a fifth small gear 24 disposed coaxially with the third and fourth large gears 22 and 23. These gears are laid out inside the lateral walls of the box body 2, with the fifth small gears 24 on each side of the box body 2 interconnected with the rack 25. A toothed part 23a is formed only in part of the circumference of the fourth large gear 23 so that the toothed part 23a is meshed with the first small gear 20 as shown in in FIGS. 6 and 7 at a fixed time interval. The oblong hole 19 formed in the ring member 18 lies in parallel to the longitudinal direction of the lid 1 and also to the direction of motion of the operating button 5 and further in parallel to the lengthwise direction of the bottom of the L-shaped lock hole 13 of the lock member 11 and has a length roughly eequal to the length of the bottom of the L-shaped lock hole 13.

In the lid opening and shutting apparatus, since the operating buttons 5 are movably supported in the corresponding through holes 4 of the lid 1 and the rotary shafts 8 of the spring means 7 are idly inserted in the corresponding communicating holes 6 of the operating buttons 5, the resilient parts 9 of the spring means 7 are bent inwardly inside the depressed part 3 of the lid 1 and the operating buttons 5 are urged outwardly from the through holes 4 by virtue of the resilient pressure generated by the resilient parts 9.

When, in the state described above, the lid 1 is set to cover the opening of the box body 2, the rotary shafts 8 of the spring means 7 are guided and retracted by the corresponding tapered guide parts 12 of the lock members 11 and, on arrival at the L-shaped lock holes 13 of the lock members 11, are automatically locked at the terminal edges thereof. Thus, the lid assumes the state of unfailing closure with respect to the box body as illustrated in FIG. 4.

While the lid 1 is kept in the state of closure, the rotary shafts 8 of the spring means 7 serving as axes of rotation are infallibly fastened to the lock holes 13 of the corresponding lock members 11 while being urged by the resilient pressure derived from the bending of the pair of resilient parts 9 of the spring means 7 and, at the same time, the ring members 18 on the side of the lid 1 are meshed with the second medium gears 21 on the side of the box body 2 respectively and consequently positioned safely outside the corresponding lock members 11. Thus, the oblong holes 19 of the ring members 18 are allowed to coincide with the bottoms of the lock holes 13.

When the lid 1 is to be released from the state of closure on the left side in FIG. 4, for example, the operating button 5 on the left side accompanied by the rotary shaft 8 of the spring means 7 idly inserted in the communicating hole 6 is pressed inwardly against the resilient pressure and rotated upwardly. As a result, the rotary shaft 8 of the spring means 7 is moved inside the bottoms of the lock holes 13 of the lock members 11 and then moved upwardly as illustrated in FIG. 5 and consequently readied for easy separation from the lock holes 13 of the lock members 11.

Figure 5:
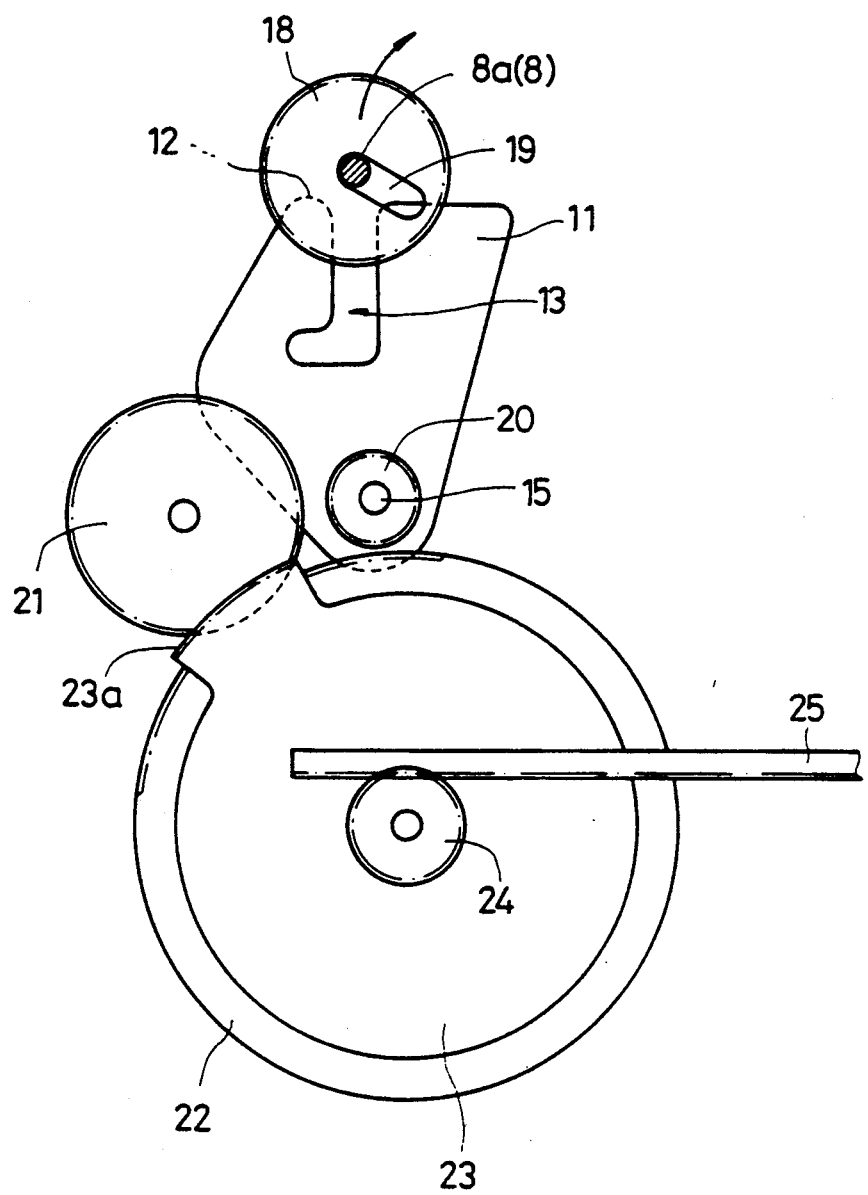
FIG. 5 is an enlarged explanatory view illustrating the state in which a rotary shaft of spring means has been released from a lock hole of a lock member.

In this operation for opening the lid 1, the gear-shaped ring members 18 on the open side are disengaged from the second medium gears 21 and put to motion in concert with the rotation of the lid 1 as indicated by the arrow in FIG. 5. At this time, the terminals 8a of the rotary shaft 8 are allowed to move inside the oblong holes 19 of the corresponding ring members 18 and go to aid in the separation of the rotary shaft 8 from the lock holes 13 of the lock members 11. On the open side, therefore, the presence of the gear-shaped ring members 18 has absolutely no possibility of constituting an obstacle.

On the right side now seating the fulcrum of rotation of the lid 1, the gear-shaped ring members 18 on the right side are rotated while being synchronized with the opening motion of the lid 1 so as to rotate the second medium gears 21 meshed with the ring members 18 in a prescribed direction as indicated by an arrow in FIG. 4. As a result, when the third large gears 22 meshed with the second medium gears 21 are rotated, the fifth small gears 24 disposed coaxially therewith are rotated in the same direction and the rack 25 meshed with the fifth small gears 24 is consequently moved horizontally in the rightward direction in the bearings shown in FIG. 4.

Figure 6:
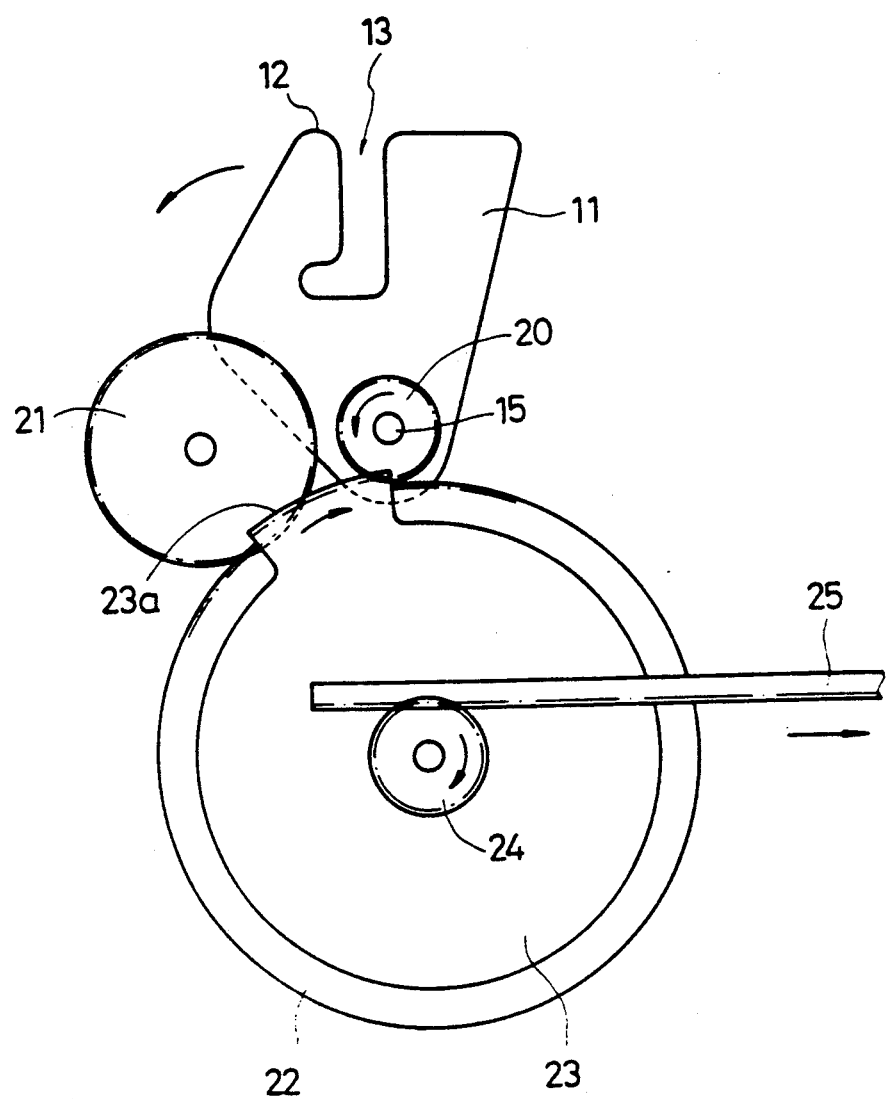
FIG. 6 is an enlarged explanatory view illustrating the state in which a fourth large gear and a first small gear of the rotary gear mechanism are held in a meshed state.

In consequence of the horizontal motion of the rack 25, the fifth small gears 24 on the left side, i.e. on the open side, are rotated in the direction indicated by an arrow in FIG. 6 so as to rotate the fourth large gears 23 disposed coaxially therewith in the same direction and, after the lapse of a prescribed time, bring the toothed parts 23a of the fourth large gears 23 into engagement with the first small gears 20 fixed on the connecting shaft 15.

Figure 7:
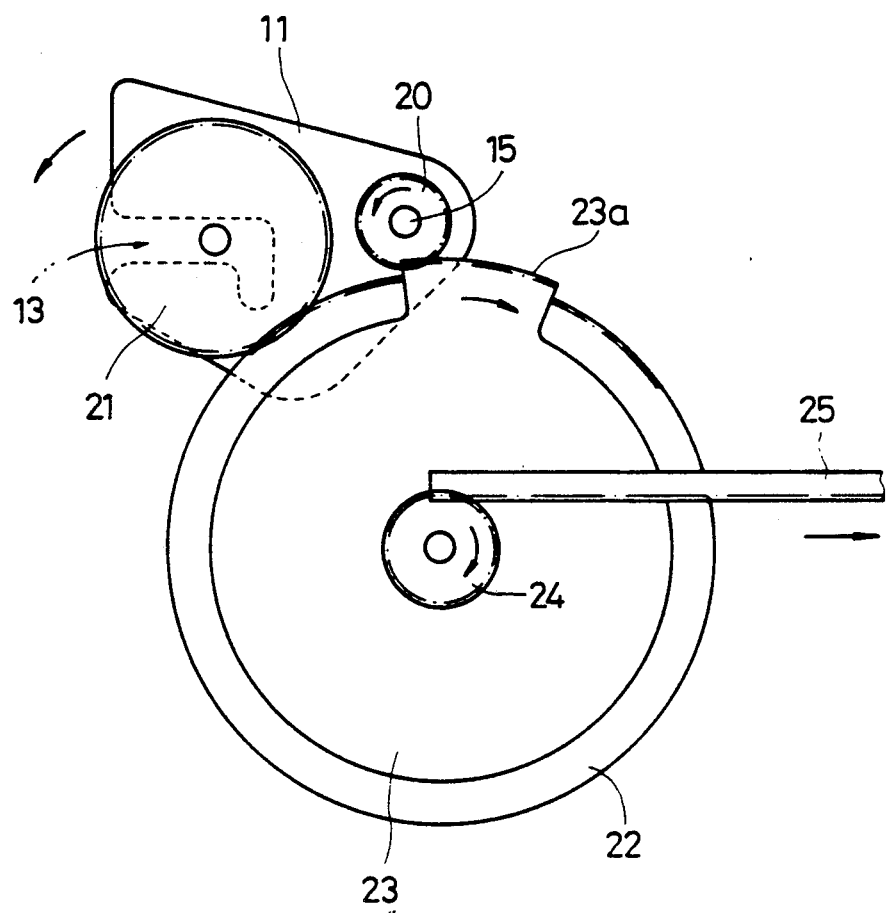
FIG. 7 an enlarged explanatory view illustrating the state in which the lock member is rotated toward a storage mouth.

When the upward rotation of the lid 1 around the rotary shaft 8 fastened to the lock members 11 on the right side as a fulcrum is continued further, the lock members 11 on the left side are synchronously rotated gradually in the direction of the respective storage mouths 14 in spite of the resilient pressure of the double torsion spring 16 as illustrated in FIG. 7 and are finally submerged completely within the corresponding storage mouths 14 as illustrated in FIG. 8. The construction for causing the fourth large gears 23 to be engaged with the first small gears 20 at a fixed time interval is intended to prevent the lock members 11 from being rotated in the direction of the storage mouths 14 until the rotary shafts 8 are completely separated from the lock holes 13 of the lock members 11.

The rotation of the fifth small gears 24 on the open side results in rotation of not only the fourth large gears 23 but also the third large gears 22 disposed coaxially therewith. This operation only keeps the second medium gears 21 in an idling state and has absolutely no bearing on the rotation of the lock members 11.

While the lid 1 is in its completely open state, the lock members 11 on the open side are wholly concealed in the storage mouths 14 as illustrated in FIG. 8. Thus, there is precluded the possibility of the lock members protruding upwardly in an erected state and impairing the attractiveness of the appearance of the lid in an open state as has been experienced in the formerly proposed lid switching device. The apparatus of the present invention has absolutely no possibility of the presence of the lock members 11 constituting an obstacle during the insertion or removal of an object into or from the box body 2.

On the rotary fulcrum side, the rotary shaft 8 fastened with the resilient pressure to the lock members 11 need not be relied on as a sole fulcrum of rotation, because the ring members 18 on the same side are rotated at one same position while being simultaneously meshed with the second medium gears 21, and the lid 1 is consequently rotated stably in the opening direction. The possibility that during the release of the lid 1 from its shut state, the rotary shaft 8 serving as a fulcrum of rotation will accidentally move out of its position and clatter is completely removed. Furthermore, the rotation of the lid 1 and the consequent sympathetic rotation of the ring members 18 entail a gradual change in the direction of the oblong holes 19 in the ring members 18 and disrupt the coincidence between the directions of the oblong holes 19 and the bottoms of the lock holes 13 in the lock members 11 as shown in FIG. 8. Even when an external force is exerted accidentally on the operating bottons 5 during the absence of this coincidence, the possibility that the rotary shaft 8 on the rotary fulcrum side will readily separate from the lock holes 13 of the lock members 11 and the lid 1 will consequently break off the box body 2 is completely eliminated by the regulating action of the oblong holes 19 in the ring members 18.

The lid having been opened on the left side is rotated downwardly to be shut. As a result, the ring members 18, second medium gears 21, third large gears 22 and fifth small gears 24 on the rotary fulcrum side are rotated in their respective directions opposite those mentioned in the case of opening the lid on the left side as described above, and the racks 25 are moved in the leftward direction in the bearings shown in FIG. 8. Consequently, the fourth large gears 23 and first small gears 20 are disengaged from each other and the lock members 11 are automatically rotated again with the resilient pressure of the double torsion springs 16 and synchronously erected upwardly out of the storage mouths 14 on the open side.

Then, the downward rotation of the lid 1 around the rotary shaft 8 fastened to the lock members 11 on the right side as a fulcrum of rotation is continued. As a result, the rotary shaft 8 of the spring means 7 on the left side collides against the tapered guide parts 12 of the erected lock members 11 and are guided by the guide parts 12 and automatically fastened again to the lock holes 13 of the lock members 11. Consequently, the lid 1 assumes the same infallibly shut state as described above.

Conversely, for the purpose of opening the lid 1 on the right side in the bearings shown in FIG. 4, the operating button 5 on the right side is depressed inwardly against the resilient pressure accompanied by the rotary shaft 8 of the spring means 7 idly inserted in the communicating holes 6. As a result, the rotary shaft 8 of the spring means 7 is readily removed from the lock holes 13 of the lock members 11 in the same manner as described above. Consequently, the lid 1 can be readily opened from the right side as illustrated in FIG. 9 by rotating the lid 1 straight upwardly around the rotary shaft 8 fastened to the lock holes 13 of the lock members 11 on the left side as a fulcrum of rotation.

In this case, the ring members 18 on the left side rotate the second medium gears 21 synchronously with the opening action of the lid 1 on the rotary fulcrum side. As a result, the third gears 22 meshed with the second medium gears 21 are rotated and, at the same time, the fifth small gears 24 disposed coaxially therewith are rotated and the racks 25 meshed with the fifth small gears 24 are consequently moved in the leftward direction in the bearings shown in FIG. 9. In consequence of the motion of the racks 25, the fifth small gears 24 on the right side are rotated and the fourth large gears 23 disposed coaxially therewith are rotated in the same direction and, after the lapse of a prescribed time interval, meshed with the first small gears 20 fixed to the connecting shaft 15.

Similarly when the lid 1 is opened on the right side, therefore, the lock members 11 on the open side are gradually rotated in the direction of the storage mouths 14 against the resilient pressure of the double torsion spring 16 while being synchronized with the opening action of the lid 1 and are finally submerged in the corresponding storge mouths 14. While the lid 1 is in the finally open state, the possibility of the lock members 11 protruding upwardly and impairing the attractiveness of the appearance of the apparatus and consequently constituting an obstacle to the insertion or extraction of an object into or from the box body 2 is precluded in the same manner as when the lid 1 is opened on the left side.

Although the gear mechanisms G are provided one each for the lock members 11, the necessity for removing the lid 1 from the box body 2 can be readily fulfilled by simultaneously depressing the two operating buttons 5 inwardly and consequently removing the two rotary shafts 8 of the spring means 7 together from the lock holes 13 of the lock members.

The embodiment described above, for the purpose of promoting structural simplicity, has the rotary shafts disposed integrally in the opposite lateral parts of the rectangular spring means 7 to serve concurrently as fulcra of rotation of the lid. Optionally, these rotary shafts may be formed separately of the spring means.

Furthermore, the present embodiment has been described as applied to the lid for an autobobile console box. The present invention is not limited to this particular application, but may be easily practised otherwise without departing from the spirit of the invention and without reference to the designation of the subject matter of application as in various lids and doors including refrigerator doors, on the sole condition that the lid or door should be capable of being opened or shut in two directions.

Owing to the adoption of the construction described above, the present invention enables the lid disposed rotatably on the opening of the box body to be opened or shut selectively in two directions. Thus, the present invention ensures that the lid always produces an infallible opening or shutting motion with a click and assumes a safe open or shut state. Even if the opening and shutting operatons of the lid is frequently repeated, the present invention is free from the possibility of eventually failing to meet the expectation of a smooth opening or shutting motion or an infallible open or shut state as experienced with the conventional apparatus.

Moreover, in the present invention, owing to the construction having the lock members rotatably supported in place in the storage mouths dug in the box body and the gear mechanisms for rotation provided one each for the lock members supported pivotally in the storage mouths so that the gear mechanisms are interconnected to each other, the lock members on the open side can be rotated and automatically submerged inside the storage mouths by the synchronized drive of the gear mechanisms on the rotary fulcrum side and the gear mechanisms on the open side without reference to the choice of the direction for opening the lid. During the release of the lid from its shut state, therefore, the possibility of the lock members protruding upwardly, impairing the attractiveness of the appearance of the apparatus and constituting an obstacle to the insertion or extraction of an object into or from the box body is completely eliminated.

What is claimed is:

1. An apparatus for opening and closing a lid disposed rotatably on an opening of a box body selectively in two directions, which comprises:
a pair of operating members independently movably supported one each at opposite ends of the lid;
spring means having a pair of rotary shafts disposed on an inner side of the lid so as to advance or retreat under the influence of resilient pressure of said spring means, said rotary shafts being connected to said operating members so as to urge said operating members outwardly away from each other by virtue of the resilient pressure of said spring means;

two pairs of storage mouths formed in an edge of said box body defining the opening of the box body at four corner portions thereof;

two pairs of lock members pivotally supported inside said storage mouths for detachably supporting said rotary shafts above said storage mouths;

each of said rotary shafts connected to said operating members being released from said lock members by a pressing operation of the corresponding operating member; and two pairs of rotary gear mechanisms attached to said lock members so that each pair of rotary gear mechanisms are interconnected to each other and the two pairs of rotary gear mechanisms are interlocked with each other;

whereby the pressing operation of one of said operating members to open the lid in one direction causes one pair of lock members on the side being opened to be rotated and plunged into the corresponding pair of storage mouths due to the interlocking between said two pairs of rotary gear mechanisms.

2. An apparatus according to claim 1, wherein said two pairs of rotary gear mechanisms each comprise a gear-shaped ring member disposed on a side of the lid and a plurality of gears disposed on a side of the box body, said gear-shaped ring member having teeth formed on its circumferential surface and an oblong hole bored in its central part for allowing a terminal of said rotary shaft to be idly inserted therein, said plurality of gears comprising a first small gear fixed to a terminal part of said connecting shaft, a second medium gear meshed with said gear-shaped ring member, a third large gear meshed with said second medium gear, a fourth large gear disposed coaxially with said third large gear and being meshed with said first small gear when the lid is opened to a prescribed extent, and a fifth small gear disposed coaxially with said third and fourth large gears, the two rotary gear mechanisms disposed on each side of the box body having their respective fifth small gears interconnected to each other with a rack.

3. An apparatus according to claim 2, wherein said fourth large gear has a toothed part formed in part of its circumference so that said toothed part is meshed with said first small gear at a fixed time interval.

* * * * *